(12) United States Patent
Sousa et al.

(10) Patent No.: US 11,625,285 B2
(45) Date of Patent: Apr. 11, 2023

(54) ASSIGNING WORKLOADS IN A MULTI-NODE PROCESSING ENVIRONMENT USING FEEDBACK FROM EACH NODE

(71) Applicant: EMC IP Holding Company LLC, Hopkinton, MA (US)

(72) Inventors: Eduardo Vera Sousa, Niteroi (BR); Edward José Pacheco Condori, Rio de Janeiro (BR); Tiago Salviano Calmon, Rio de Janeiro (BR); Vinícius Michel Gottin, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 71 days.

(21) Appl. No.: 16/886,912

(22) Filed: May 29, 2020

(65) Prior Publication Data

US 2021/0373966 A1   Dec. 2, 2021

(51) Int. Cl.
 *G06F 9/50* (2006.01)
 *G06F 9/54* (2006.01)

(52) U.S. Cl.
 CPC .......... *G06F 9/5083* (2013.01); *G06F 9/547* (2013.01)

(58) Field of Classification Search
 CPC .............................. G06F 9/5083; G06F 9/547
 See application file for complete search history.

(56) References Cited

U.S. PATENT DOCUMENTS

| | | | |
|---|---|---|---|
| 2014/0297833 A1* | 10/2014 | Bedini | H04L 43/0876 709/224 |
| 2015/0163159 A1* | 6/2015 | DeCusatis | H04L 41/0896 709/226 |
| 2016/0140001 A1* | 5/2016 | Kulkarni | G06F 9/5066 714/4.12 |

(Continued)

OTHER PUBLICATIONS

A. Mirhoseini, H. Pham, Q. V. Le, B. Steiner, R. Larsen, Y. Zhou, N. Kumar, M. Norouzi, S. Bengio and J. Dean, "Device Placement Optimization with Reinforcement Learning," 2017.

(Continued)

*Primary Examiner* — Emerson C Puente
*Assistant Examiner* — Jonathan R Labud
(74) *Attorney, Agent, or Firm* — Ryan, Mason & Lewis, LLP

(57) ABSTRACT

Techniques are provided for assigning workloads in a multi-node processing environment using resource allocation feedback from each node. One method comprises obtaining feedback from distributed nodes that process workloads, wherein the feedback for a given node indicates (i) an allocation of resources, and (ii) a number of executing workloads. In response to receiving a given workload to be processed, candidate nodes are identified to execute the given workload; and the given workload is assigned to a given candidate node based on an amount of available resources on each candidate node and/or a stability of resource adjustments made for each candidate node. The stability of the resource adjustments made for each candidate node can be evaluated based on a maximum resource (Continued)

adjustment made for a given candidate node relative to a maximum resource adjustment made for each of the candidate nodes.

20 Claims, 9 Drawing Sheets

(56) References Cited

U.S. PATENT DOCUMENTS

2018/0203728 A1* 7/2018 Yan ..................... G06F 9/4881
 718/104
2018/0255122 A1* 9/2018 Hu ..................... G06F 11/3006

OTHER PUBLICATIONS

J. E. Ruoyang Xiu, "Workload Engineering: Optimising WAN and DC Resources Through RL-Based Workload Placement," 2017.
U.S. Appl. No. 16/456,551 entitled, "Adaptive Controller for Online Resource Allocation for Multiple Workloads," filed Jun. 28, 2019.
U.S. Appl. No. 16/832,031 entitled, "Dynamic Resource Allocation Based on Fingerprint Extraction of Workload Telemetry Data," filed Mar. 27, 2020.
U.S. Appl. No. 16/554,897 entitled, "Model-Based Initialization of Workloads for Resource Allocation Adaptation," filed Aug. 29, 2019.
U.S. Appl. No. 16/038,373 entitled, "Detection of Resource Bottlenecks in Execution of Workflow Tasks Using Provenance Data," filed Jul. 18, 2018.
U.S. Appl. No. 16/039,743 entitled, "Allocation of Shared Computing Resources Using Source Code Feature Extraction and Clustering-Based Training of Machine Learning Models," filed Jul. 19, 2018.

* cited by examiner

ASSIGNING WORKLOADS IN A MULTI-NODE PROCESSING ENVIRONMENT USING FEEDBACK FROM EACH NODE

FIELD

The field relates generally to information processing systems and more particularly to assigning workloads in such information processing systems.

BACKGROUND

Cloud computing has become increasingly popular due to a number of benefits. For example, cloud computing offers pay-per-use computation for customers and resource sharing for service providers. Through virtualization, a pool of computation devices can be abstracted and computational resources can be offered that are tailored to the needs of customers, who may contract for more computation as their needs grow.

Using an infrastructure efficiently to execute workloads while respecting Service Level Agreements (SLAs) and, thus, ensuring a specified Quality of Service, poses a number of challenges. In a multi-node environment that processes multiple workloads, for example, the configuration of the various nodes may differ and different workloads may be better executed on particular nodes.

A need exists for improved techniques for assigning workloads to nodes in a multi-node environment.

SUMMARY

In one embodiment, a method comprises obtaining feedback from a plurality of distributed nodes in a distributed environment that processes a plurality of workloads, wherein each node comprises a controller and a plurality of processing devices and wherein the feedback for a given node indicates (i) an allocation of resources associated by the given node, and (ii) a number of workloads executing on the given node; and performing the following steps, in response to receiving a given workload to be processed: identifying one or more candidate nodes of the plurality of distributed nodes to execute the given workload; and assigning the given workload to a given one of the candidate nodes based at least in part on one or more of an amount of available resources on each candidate node and a stability of resource adjustments made for each candidate node.

In at least some embodiments, the feedback for the given node is stored in a short-term memory that retains the feedback based at least in part on an average workload lifetime for the given node. In one or more embodiments, the assigning the given workload to the given candidate node employs a respective weight for each of the amount of available resources on each candidate node and the stability of the resource adjustments made for each candidate node, and wherein the assigning the given workload to the given candidate node selects the candidate node based at least in part on a sum of the weighted amount of available resources and the weighted stability of the resource adjustments. The stability of the resource adjustments made for each candidate node can be evaluated, for example, based at least in part on a maximum resource adjustment made for a given candidate node relative to a maximum resource adjustment made for each of the candidate nodes.

Other illustrative embodiments include, without limitation, apparatus, systems, methods and computer program products comprising processor-readable storage media.

DETAILED DESCRIPTION

Figure 1:
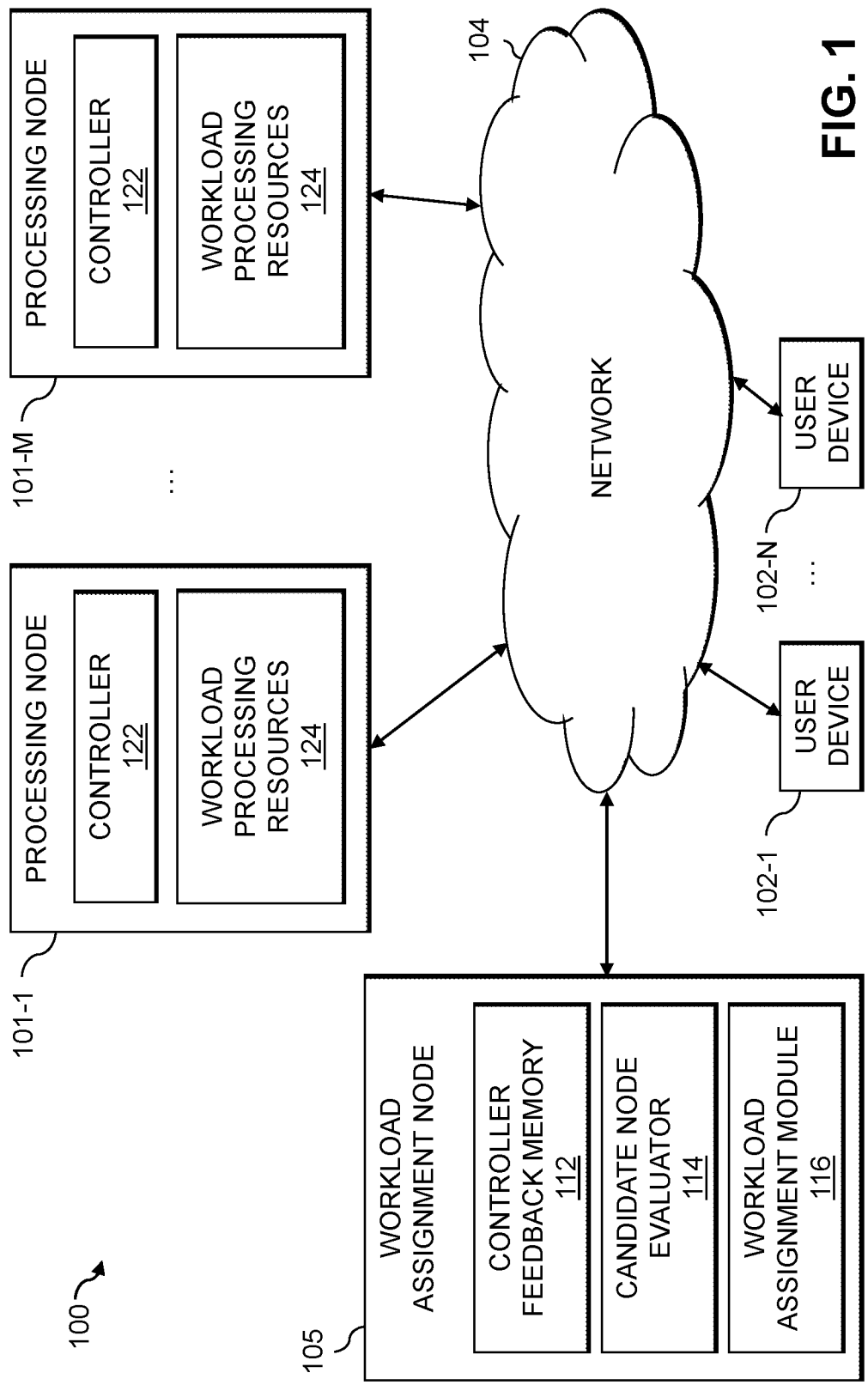
FIG. 1 illustrates an information processing system configured for assigning workloads to nodes in a multi-node processing environment using resource allocation feedback from each node, according to an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for assigning workloads to nodes in a multi-node processing environment using resource allocation feedback from each node.

It can be challenging to use an infrastructure efficiently to execute jobs while respecting SLAs and, thus, guaranteeing a Quality of Service. For example, SLAs are typically set prior to the execution of a job, but the execution environment may be subject to several possible disturbances, such as limited knowledge about actual resource needs, demand peaks and hardware malfunctions. The challenge can be greater in data center environments where the configuration of the nodes may differ and there may be restrictions over gathering information for management and orchestration of resources. In addition, since different workloads have different bottlenecks, some workloads are better executed in some environments than in others. One approach that deals with the adaptation of resource allocation within nodes uses control theory agents. In one or more embodiments of the present disclosure, techniques are provided for workload assignment in data centers that leverage feedback from the controllers of each node to assign each workload to one or more nodes across a multi-node data center.

Many companies are redefining business operations, for example, through mergers, acquisitions, and partnerships. Such companies may thus require new strategies to combine their large-scale distributed software systems and to enable autonomous global data centers. Cloud computing offers a number of benefits, including pay-per-use computation from the customer perspective and resource sharing from the service provider perspective. Through the virtualization employed in such cloud environments, it is possible to abstract a pool of computational devices and to offer computational resources that are better tailored to the needs of customers (e.g., who may contract for more computation as their needs grow). A combination of hybrid and multi-cloud techniques have enabled more complex deployment models. In addition, modern infrastructure software systems need to be updated to support current and future business demands.

The global data center architectures also need to be aligned to current model executions, such as serverless computing, where issues such as resource allocation, scalability and high availability are often transparent to users and are solved by the serverless vendors. In the end, users are charged for the resources consumed by their workloads and providers guarantee a quality of service through SLAs. Therefore, global data center vendors need an efficient provisioning of computing resources.

In the data center context, the resource allocation should be a concern in order to avoid bottlenecks and respect the SLA. Thus, one should aim to provide the best allocation of resources for each node and for the devices in each node. Notice that the nodes may be heterogeneous, e.g., has different devices attached to it (such as GPUs and/or CPUs) and, since the workloads may have steps that demand different devices, an allocation should be provided in order to cope with the service level that does not waste resources, which may impact on the power consumption of the data center.

A data center software system is not typically aware of which node can be better suited for a workload execution and the device (or devices) that the workload will need. This may lead to a misuse of resources by over or under allocating resources for a particular workload. Notice that this problem can be aggravated when running multiple workloads in a data center, since a wrong allocation may impact the performance of other executions.

FIG. 1 shows a computer network (also referred to herein as an information processing system) 100 configured in accordance with an illustrative embodiment. In some embodiments, the computer network 100 is configured as a multi-node distributed processing environment that assigns workloads to nodes using resource allocation feedback from each node. As shown in FIG. 1, the exemplary computer network 100 comprises a plurality of processing nodes 101-1 through 101-M, collectively referred to herein as processing nodes 101, and a plurality of user devices 102-1 through 102-N, collectively referred to herein as user devices 102. A workload assignment node 105 assigns workloads to the processing nodes 101 using resource allocation feedback from each processing node 101.

The processing nodes 101, user devices 102 and workload assignment node 105 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment.

The processing nodes 101 may comprise a controller 122, as discussed further below in conjunction with FIG. 3, and one or more workload processing resources 124. The workload processing resources 124 may comprise homogeneous or heterogenous devices, such as processing devices (e.g., GPUs and/or CPUs), memory and/or storage devices, and network devices, as would be apparent to a person of ordinary skill in the art. Thus, each processing node 101 comprises a possibly distinct and heterogeneous set of workload processing resources 124.

In the example of FIG. 1, each processing node 101 has a dedicated controller 122. The controllers 122 control an assignment of resources to each workload executing on a respective node to satisfy one or more SLAs. It is noted, however, that no strict relationship is required between workload processing reources 124 and controllers 122. For example, a single controller 122 can be associated to many devices in some processing nodes 101, while each homogenous device in additional processing nodes 101 may be associated with a distinct controller 122. The controllers 122 provide adaptation information in a feedback manner to a controller feedback memory 112, discussed below, of the workload assignment node 105. The disclosed techniques for assigning workloads to processing nodes 101 in the multi-node processing environment of FIG. 1 employ the adaptation information of the controllers 122 to perform the workload assignment decision.

In some embodiments of the disclosure, the exemplary multi-node processing environment (e.g., a data center) of FIG. 1 is broadly defined as a collection of computational resources abstracted as nodes. Each processing node 101 in such a data center may comprise a different set of workload processing resources 124, such as GPUs, different configurations of CPUs and memory. Different workloads may require different amounts of each of these resources and may have SLA requirements that imply the need for a particular resource (such as a GPU being required for fast deep neural network training, or a particularly heavy workload requiring a large storage class memory cache array).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

Figure 6:
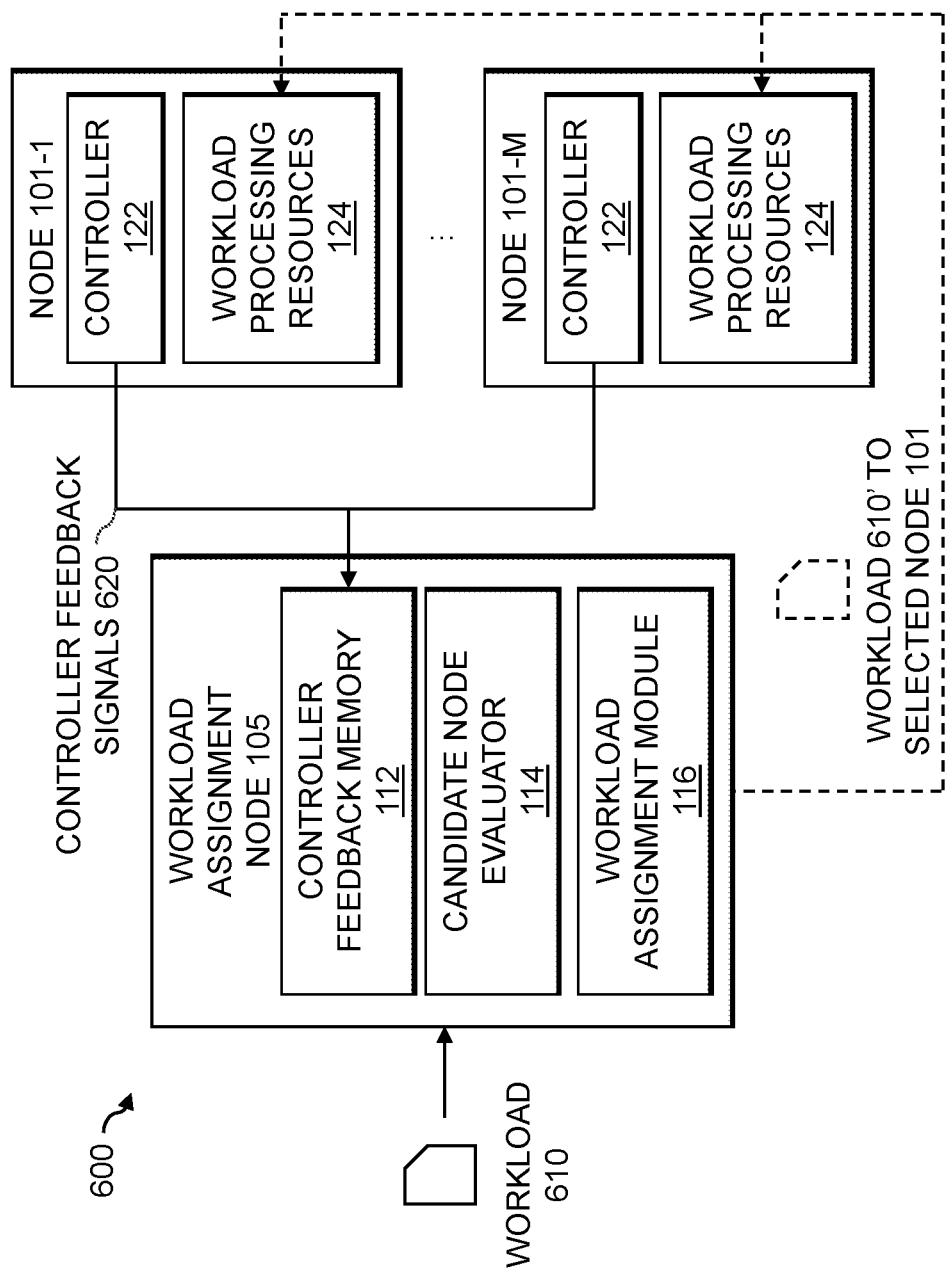
FIG. 6 illustrates the information processing system of FIG. 1 configured to assign a new workload to one or more nodes in the multi-node processing environment, according to one or more illustrative embodiments.

As shown in FIG. 1, the exemplary workload assignment node 105 comprises a controller feedback memory 112 that stores feedback information received, for example, from the controllers 122 of processing nodes 101, a candidate node evaluator 114 that identifies one or more candidate processing nodes 101 to process a given workload, and a workload assignment module 116 that assigns one or more workloads to one or more nodes in the multi-node processing environment, as discussed further below in conjunction with FIG. 6. Generally, in one or more example embodiments, the workload assignment module 116 assigns a given workload to a given candidate processing node 101 based on an amount of available resources on each candidate node and/or a stability of resource adjustments made for each candidate node, as discussed further below.

In some embodiments, discussed further below, the controller feedback memory 112 is implemented as a short-term memory that retains the feedback information received from the controllers 122 based on an average workload lifetime for the particular processing nodes 101.

In one or more embodiments, the processing nodes 101 are accessible and interconnected. Thus, for each new workload deployed, the candidate node evaluator 114 considers all currently known processing nodes 101 for an allocation.

It is to be appreciated that this particular arrangement of elements 114 and 116 illustrated in workload assignment node 105 of the FIG. 1 embodiment is presented by way of example only, and alternative arrangements can be used in other embodiments. For example, the functionality associated with elements 114 and 116 in other embodiments can be combined into a single module, or separated across a larger number of modules. As another example, multiple distinct processors can be used to implement different ones of elements 114 and 116 or portions thereof. At least portions of elements 114 and 116 may be implemented at least in part in the form of software that is stored in memory and executed by a processor.

An exemplary process utilizing elements 114 and 116 of an example workload assignment node 105 in computer network 100 will be described in more detail with reference to the FIGS. 6 and 7.

While the workload assignment node 105 is shown as being distinct from the processing nodes 101 in the example of FIG. 1, one or more of the processing nodes 101 can implement the workload assignment node 105 in other embodiments, as would be apparent to a person of ordinary skill in the art. If a particular processing node 101 is dedicated or assigned to the management and monitoring of the overall data center, the particular processing node 101 is selected to serve as the workload assignment node 105 This is often the case. Monitoring systems, for example, will collect the heartbeat information of all processing nodes 101 in the data center in a single node, plus a redundant node for failure-resiliency. If this is not the case, however, then one of the processing nodes 101 or a dedicated node will serve as the workload assignment node 105 and perform the disclosed techniques for assigning workloads to processing nodes 101 in the multi-node processing environment using resource allocation feedback from each processing node 101. If the workload assignment node 105 is changed during the deployment, the controller feedback memory 112 can be moved to the new central node.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Although shown in FIG. 1 as being part of the workload assignment node 105, in some embodiments, the controller feedback memory 112 can be a separate database, accessed over the network 104, that is configured to store the feedback information received from the controllers 122 of processing nodes 101. Such as database in the present embodiment can be implemented using one or more storage systems associated with the workload assignment node 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the workload assignment node 105 can be one or more input-output devices (not shown), which illustratively comprise keyboards, displays or other types of input-output devices in any combination. Such input-output devices can be used, for example, to support one or more user interfaces to the workload assignment node 105, as well as to support communication between the workload assignment node 105 and other related systems and devices.

The processing nodes 101, user devices 102 and the workload assignment node 105 in the FIG. 1 embodiment are assumed to be implemented using at least one processing device. Each such processing device generally comprises at least one processor and an associated memory, and implements one or more functional modules for controlling certain features of the workload assignment node 105.

More particularly, processing nodes 101, user devices 102 and workload assignment node 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interfaces allow the processing nodes 101, user devices 102 and/or the workload assignment node 105 to communicate over the network 104 with each other (as well as one or more other networked devices), and illustratively comprises one or more conventional transceivers.

It is to be understood that the particular set of elements shown in FIG. 1 for assigning workloads to one or more of the processing nodes 101 in the multi-node processing environment using resource allocation feedback from each processing node 101 is presented by way of illustrative example only, and in other embodiments additional or alternative elements may be used. Thus, another embodiment includes additional or alternative systems, devices and other network entities, as well as different arrangements of modules and other components.

Figure 2:
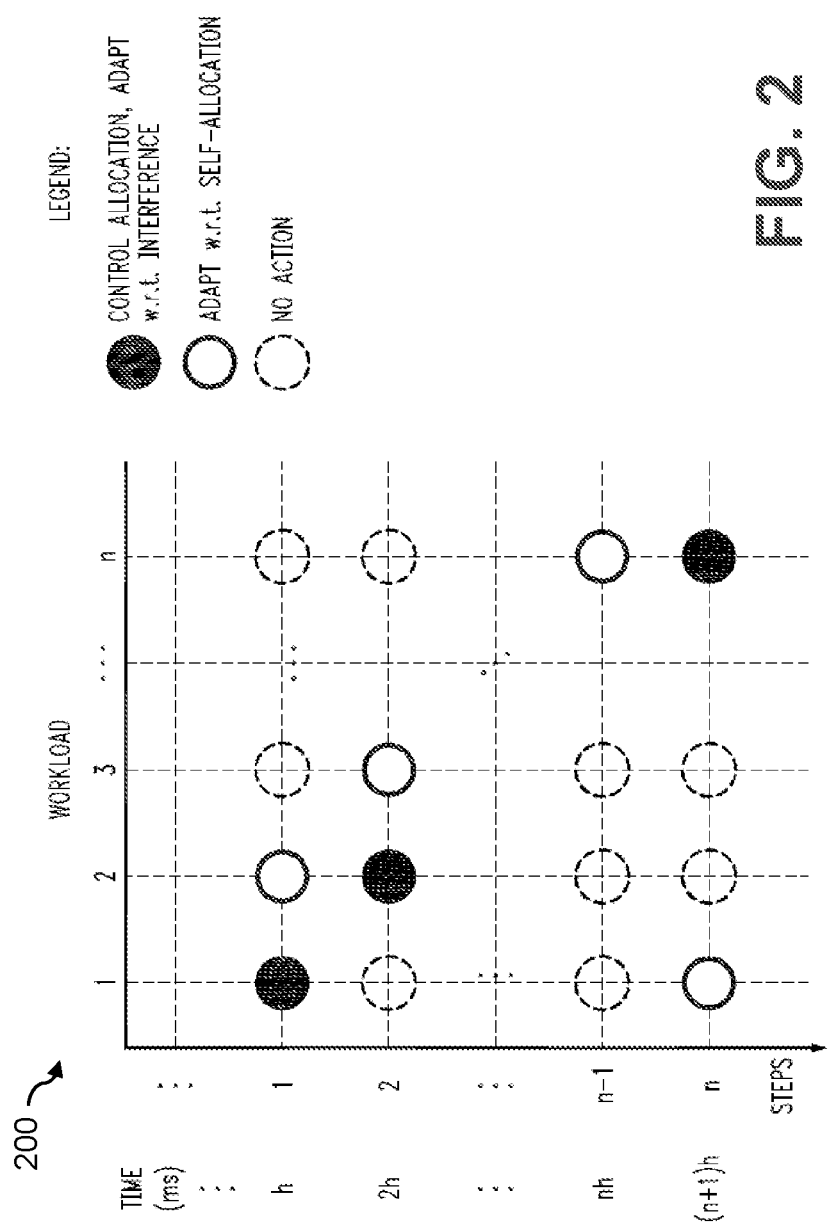
FIG. 2 illustrates an exemplary cycle for adapting a resource allocation for multiple workloads, according to some embodiments.

FIG. 2 illustrates an exemplary cycle 200 of an alternating control/adaptation schema for adapting a resource allocation for multiple workloads (1 through n), according to some embodiments. An adaptation engine, as discussed further below in conjunction with FIG. 2, adapts with respect to self-allocation for n−1 steps (e.g., steps 1 through n−1) after it changed its allocation. One step after that (step n), the adaptation engine changes the allocation of this workload and the cycle restarts. The steps are sampled every h milliseconds in this example.

In comparison with a naive approach, the resource allocation method for multiple workloads 'skips' n−1 steps of control allocation for each workload. Since steps are sampled every h milliseconds, in some embodiments, this means that n×h milliseconds will pass before a workload performs control allocation again. For example, in FIG. 2, the resource allocation of workload 1 will be controlled in step 1 and then again only at step (n+1), instead of at every step. This impacts a convergence time of workload 1, (convergence here defined as being close enough to the set-point, e.g., step when iteration time reaches set-point within an acceptable percentage), in proportion to the number of competing workloads n. The impact of this delayed (and reduced number of) actuations for each workload in the convergence time is reasonably small enough to justify the approach (especially in cases where n is small, no discernable effect is observed on the convergence time).

In some embodiment, a mechanism may be used to deal with the insertion and removal of workloads in an online fashion (e.g., meaning that the controller can be deployed as a continuously running process that deals with new workloads and finished workloads transparently). A mechanism is employed that keeps a list of active workload indexes $w_{idx}$ to be controlled and monitored. The list of active workload indexes $w_{idx}$ is updated in between cycles in order to avoid the impact of the interferences of newly added workloads in a workload that has not been controlled or adapted in a while.

Figure 3:
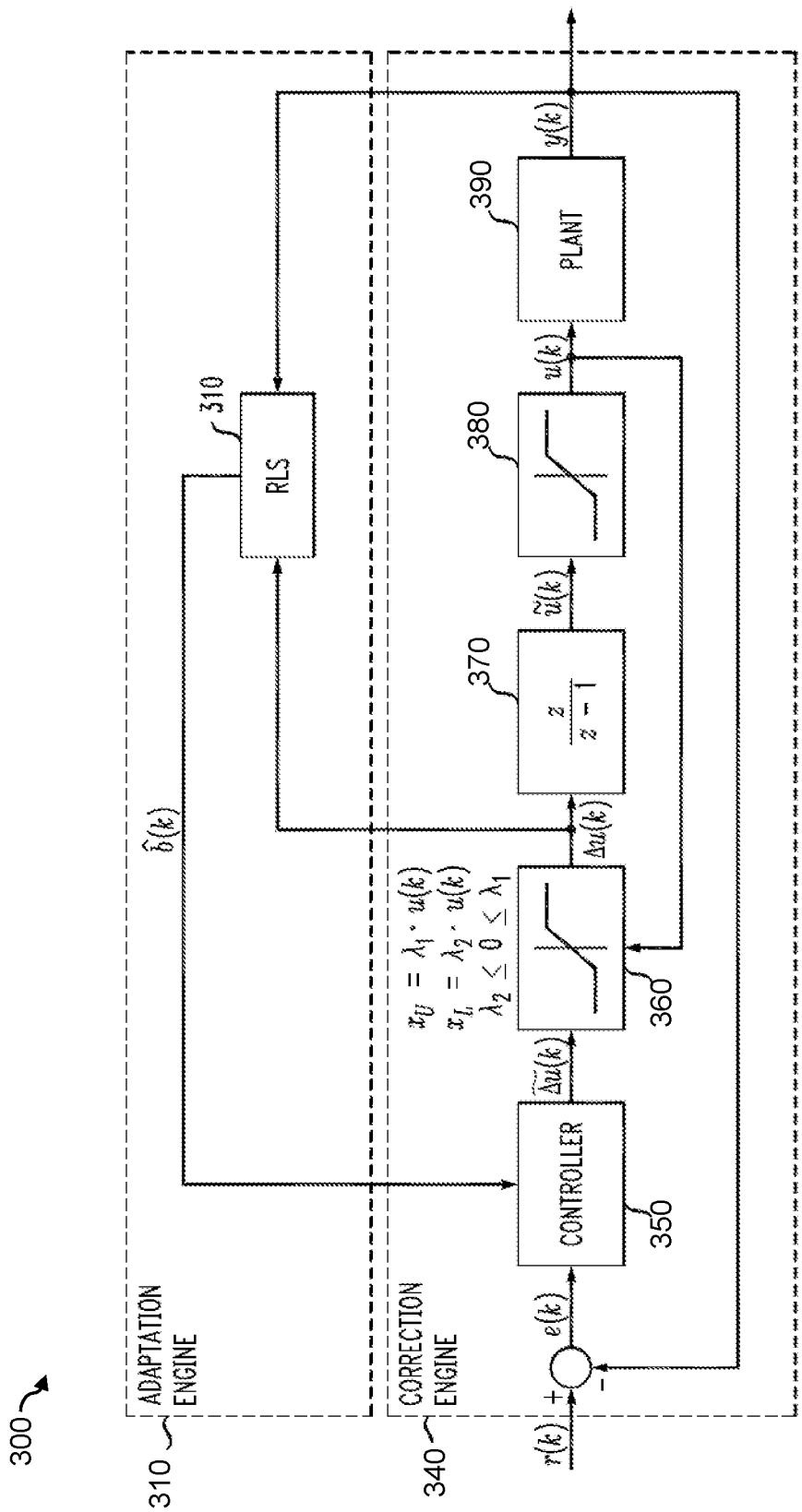
FIG. 3 illustrates an exemplary implementation of an adaptation-correction system, according to one or more embodiments of the disclosure.

FIG. 3 illustrates an exemplary adaptation-correction system 300, according to one or more embodiments of the disclosure. As shown in FIG. 3, the exemplary adaptation-correction system 300 comprises an adaptation engine 310 and a correction engine 340.

Generally, the exemplary adaptation engine 310 aims to map decisions and responses in order to get a transfer function between allocations and a given SLA metric, as discussed further below in conjunction with FIG. 4. The exemplary adaptation engine 310 comprises a Recursive Least Squares (RLS) module 320 that learns system parameters b(k), which are generated by the relation between the amount of resources added (u(k)) and the response time of the particular step y(k)).

The adaptation engine 310 may not be needed if a dynamic between resource allocation and a given SLA metric could be defined for each workload and this dynamic was the same or, at least, very similar. Since this typically cannot be assumed for each resource allocation-SLA metric pair, a learning step is needed. Even in the same job, multiple kinds of workloads might generate different allocation dynamics.

The dynamic relation between resource allocation and SLA metric is represented by Equation (1), below. It can be assumed, however, that these relationships can be mapped by a first order differential equation, as shown by X. Liu et al., "Adaptive Entitlement Control of Resource Containers on Shared Servers," *IFIP/IEEE International Symposium on Integrated Network Management*, 163-76 (May 3005), incorporated by reference herein in its entirety.

$$x(k+1)=a \cdot x(k)+b \cdot u(k) \qquad (1)$$

Equation (1) is a first-order differential equation with parameters to be discovered used as a system model for the relation between resource allocation and SLA metric.

In Equation (1), a and b are the parameters to learn, which can be learned using any regression algorithms. The parameter a represents the current SLA metric observation, whereas b represents the effect of a different allocation u(k).

The output of the RLS module 320 is a parametrized system model, $\hat{b}(k)$, that will be used by a pole-placement module in the adaptation engine 310 (where $\hat{b}$ is applied to a controller 350). The pole-placement module ensures a desired closed loop dynamic between the system input (the amount of allocated resources, r(k)) and the output, y(k) (a value of a given SLA metric).

As shown in FIG. 3, the correction engine 340 works by receiving feedback of the execution conditions, y(k), (typically, a given SLA metric) as well as the current learned model, $\hat{b}(k)$, generated by the RLS module 320 of the adaptation engine 310, as discussed hereinafter. The correction engine 340 uses this information to calculate the pole placement of the closed loop system. The pole placement calculation can be performed using Laplace Transforms, for example, when the differential equations are linear and with a finite order, or by using machine learning algorithm(s) in the more general cases, since a neural network with hidden layers is a universal approximator. See, for example, K. Hornik, "Approximation Capabilities of Multilayer Feedforward Networks," *Neural Networks*, Vol. 3, No. 4, 351-57 (1991), incorporated by reference herein in its entirety.

As shown in FIG. 3, a controller 350 takes the parameter $\hat{b}(k)$ learned by the adaptation engine 310 and uses the parameter, $\hat{b}(k)$, to modify the feedback loop dynamics, which is fed by (r(k)−y(k)=e(k)), where r(k) is a target value of the scoring metric of interest, such as a target response time, and y(k) is the current value of the scoring metric, such as the response time of the particular step, to obtain an error, e(k).

The relation of the amount of resources added (u(k)) and the response time of the particular step y(k) is assumed to be piecewise linear, and a saturation module 360 is added after the controller 350 in order to bound the error between the assumed dynamics and the actual dynamics. In some embodiments, the saturation module 360 is adaptive as well, and has two parameters, $\lambda_1$ and $\lambda_2$, as shown in FIG. 3. These two parameters, $\lambda_1$ and $\lambda_2$, are associated with a trade-off between allowed oscillation around the set-point and convergence rates. The smaller the absolute value of these parameters are, the less the system will oscillate, but convergence will be slower. An example of a particular parametrization of both parameters, $\lambda_1$ and $\lambda_2$, is discussed below in a section entitled "Example."

In the embodiment of FIG. 3, the system representation is implemented using an integrator block 370, a saturation block 380 and a plant block 390. As shown in FIG. 3, the output of the saturation module 360 is processed by the integrator block 370, represented by the equation $$\frac{z}{z-1},$$

representing an integrator block in the Z-transform domain. The integrator block 370 represents that, in some embodiments, the output from the controller 350 and initial saturation module 360 is an increment in the current allocation, rather than a full allocation. To illustrate, suppose an allocation at time instant k is x(k)=4.1, the control output from the saturation module 360 is u(k)=0.1 and model parameter a=1. A next allocation according to equation (1) will be x(k+1)=4.1+0.1=4.2, instead of just 0.1, which means that the integrator block 370 will sum the contribution of the current control output, u(k), to the current allocation to obtain a new allocation.

The output of the integrator block 370 is processed by saturation block 380, which prevents the allocation from exceeding the amount of available resources (e.g., processing cores, memory or network bandwidth available) of the device. Thus, the inferior limit of the saturation block 380 is 0 in most implementations and the superior limit of the saturation block 380 is MAX_RESOURCE, where MAX_RESOURCE is the number of processing cores, amount of memory or amount of network bandwidth available of the device, depending on the resource that is being controlled (computation, memory or network, respectively). Finally, the plant block 390 translates the allocation, x(k), into a new SLA metric, y(k). In other words, the plant block 390 is typically implemented as a highly nonlinear function modeled as a first-order differential equation that continually learns the system model, b~b, at each iteration.

For a more detailed discussion of the adaptation-correction system 300 of FIG. 3, see, for example, U.S. patent application Ser. No. 16/400,289, filed May 1, 2019, entitled "Adaptive Controller for Online Adaptation of Resource Allocation Policies for Iterative Workloads Using Reinforcement Learning," (now U.S. Pat. No. 11,366,697), U.S. patent application Ser. No. 16/456,551, filed Jun. 28, 2019, entitled "Adaptive Controller for Online Resource Allocation For Multiple Workloads," and/or U.S. patent application Ser. No. 16/554,897, filed Aug. 29, 2019, entitled "Initialization of Resource Allocation for a Workload Characterized Using a Regression Model," (now U.S. Pat. No. 11,327,801), each incorporated by reference herein in its entirety. See also, A. Mirhoseini et al., "Device Assignment Optimization with Reinforcement Learning," (2017), J. E. Ruoyang Xiu, "Workload Engineering: Optimising WAN and DC Resources Through RL-Based Workload Assignment," (2017), U.S. patent application Ser. No. 16/038,373, filed Jul. 18, 2018, entitled "Detection of Resource Bottlenecks in Execution of Workflow Tasks Using Provenance Data," (now U.S. Pat. No. 11,119,879), and/or U.S. patent application Ser. No. 16/039,743, filed Jul. 19, 2018, entitled "Allocation of Shared Computing Resources Using Source Code Feature Extraction and Clustering-Based Training of Machine Learning Models," (now U.S. Pat. No. 11,436,056), each incorporated by reference herein in its entirety.

In one or more embodiments, a model is provided characterizing the dynamics of the workload execution. The disclosed model does not need to be perfect, but flexible enough to be adaptable to a wide range of workloads. To this end, a first order model that relates the SLA metric to allocations is assumed to be good enough if adapted online. See, for example, X. Liu et al., "Adaptive Entitlement Control of Resource Containers on Shared Servers," *IFIP/IEEE international Symposium on Integrated Network Management*, 163-76 (May 3005), incorporated by reference herein in its entirety. In summary, it is assumed that the dynamics that relate allocations with SLA metrics are from the kind:

$$s_i(k) = s_i(k-1) + b_{1i}\Delta u_i(k) - b_{2i}\sum_{j\neq i} u_j(k)$$

where s(k) is the SLA metric of interest in step k, $b_{1i}$ is the term that relates the self-allocation of workload i with respect to the target SLA metric, $b_{2i}$ is the term that accounts for interference of an allocation to other workloads with respect to the target SLA metric, $u_i(k)$ is the amount of a particular resource allocated at a step k.

In some embodiments, an automatic mechanism is provided to control multiple iterative workloads from a single machine in which the workloads share resources. This control assumes no prior knowledge of such workloads and aims to stabilize these in the long run with respect to the SLA metrics. The controller takes three pieces of information as inputs:

the current SLA metric measured at the time of the control;

the previously measured SLA metric; and the amount of CPU spent by all the other concurrent workloads.

This applied information is used to fit a linear control that cancels the dynamic, a deadbeat control that cancels both the direct dynamics (e.g., the dynamics related from allocation $r_i$ to workload $w_i$) and the interferences (e.g., the dynamics related from allocations $r_j$ to workload $w_i$, j≠i). This controller extends a controller disclosed in U.S. patent application Ser. No. 16/400,289, (now U.S. Pat. No. 11,366,697), referenced above, with a new term to cancel possible effects from interferences. The control law for workload $w_i$ is, then:

$$u_i(k) = \frac{1}{k_c \cdot \hat{b}_{1i}} \cdot e_i(k) + \hat{b}_{2i}\sum_{j\neq i} u_j(k),$$

$$e_i(k) = s_i(k) - s_i(k-n+1)$$

where n is the number of controlled workloads at the point in time k.

Figure 4:
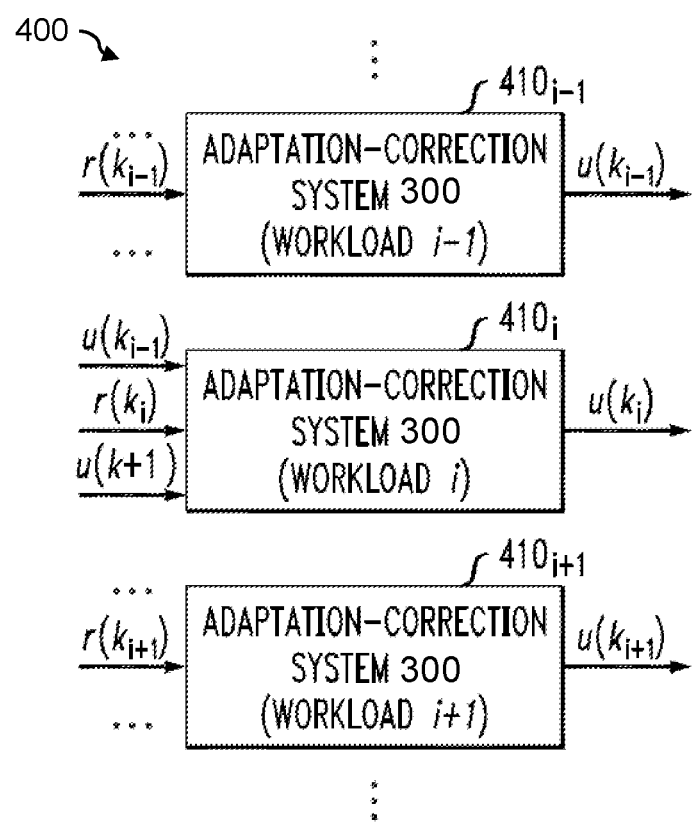
FIGS. 4 and 5 illustrate the adaptation-correction system of FIG. 3 in further detail for multiple workloads, according to embodiments of the disclosure.

FIG. 4 illustrates an implementation 400 of the adaptation-correction system of FIGS. 3 in further detail for multiple workloads, according to embodiments of the disclosure. As shown in FIG. 4, the implementation 400 comprises a plurality 410$_{i-1}$ through 410$_{i+1}$ of the adaptation-correction systems 300 of FIG. 3, each corresponding to a particular workload i–1 through i+1.

In the embodiment of FIG. 4, the adaptation-correction system 410$_i$ associated with workload i receives as inputs r(k$_i$) (target value of the scoring metric of interest 385, such as a target response time), and the amount of resources added for the other workloads (e.g., u(k$_{i-1}$) and u(k$_{i+1}$)). The adaptation-correction system 410$_i$ associated with workload i determines a new amount of resources to add for the current workload (i).

The adaptation-correction systems 410 associated with the other workloads (other than workload i) operate in a similar manner as the illustrated adaptation-correction system 410$_i$ for workload i.

Figure 5:
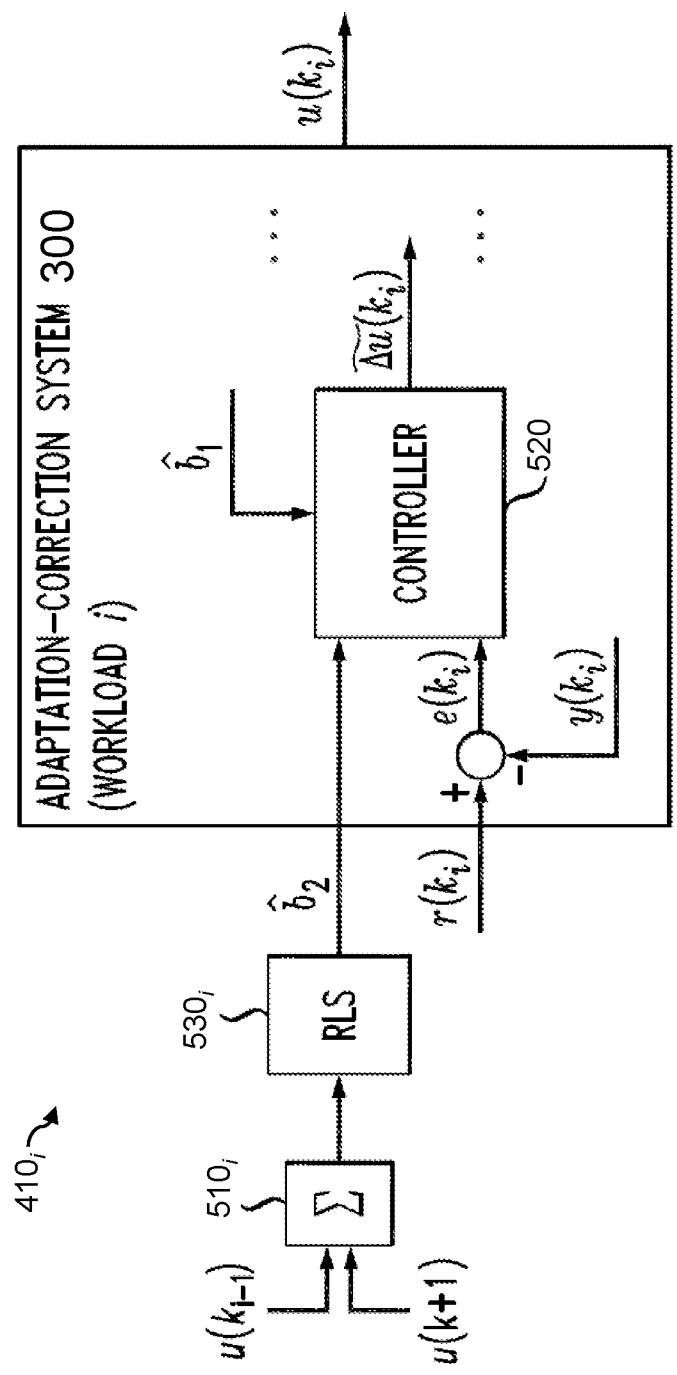

FIG. 5 illustrates the adaptation-correction system 410$_i$ associated with workload i of FIG. 4 in further detail, according to an embodiment of the disclosure. As shown in FIG. 5, the adaptation-correction system 410$_i$ comprises the proportional controller 520 of FIG. 3 (as well as the other elements of the adaptation-correction system of FIG. 3, which have been omitted for ease and clarity of illustration but operate in a similar manner as described above for the adaptation-correction system of FIG. 3).

As shown in FIG. 5, the proportional controller 520 takes the parameter $\hat{b}(k)$ learned by the adaptation engine 310 and uses the parameter, $\hat{b}(k)$, to modify the feedback loop dynamics, which is fed by (r(k)−y(k)=e(k)), where r(k) is a target value of the scoring metric of interest, such as a target response time, and y(k) is the current value of the scoring metric, such as the response time of the particular step, to obtain an error, e(k).

In addition, the adaptation-correction system 410$_i$ comprises a summer 510$_i$ to sum the allocations of the concurrent workloads (other than workload i) and uses an RLS module 530$_i$ for adaptation. RLS is a good choice for iteratively fitting a linear model, which is the case. Fitting successive linear models is faster than fitting non-linear models and can reasonably emulate these non-linearities with fast enough adaptation cycles. The direct impact of changing allocations to a particular workload are considered in some embodiments, as well as the interference caused by other workloads.

There are two different metrics influencing the behavior of the workload performance, which is measured by the SLA metrics. Thus, in some embodiments, three different actions are performed:

1. adapt the parameter of self-allocation to SLA metric relationship;
2. adapt the interference parameter; and
3. control the workload (e.g., change the allocations to reach the desired SLA metric).

There may be a conflict between the two first necessities. If both metrics are adapted concomitantly, it is not possible to know if a change in the SLA metric occurred due to a change in the allocation for that particular workload (i.e., a self-allocation change) or due to changes in other allocations, which caused more or less interference.

In one or more embodiments, the disclosed solution alternates these actions. It is believed that in many cases the self-allocation parameter is more relevant to the SLA metric than interferences, and, thus, more data points are used to adapt the self-allocation parameter to obtain a more stable configuration.

This is done by dividing the full control process into n steps, where n is the number of monitored/controlled workloads at a moment in time. (n−1) steps are used to collect enough data to adapt the self-allocation parameter, $\hat{b}_{1i}$, and the other remaining step is used to adapt the interference parameter, $\hat{b}_{2i}$, and apply the control law with both learned parameters.

In some embodiments, the present disclosure provides a method for assigning workloads to nodes in a multi-node data center with end-to-end control. In one or more embodiments, the processing nodes 101 within the data center that will execute the workloads are defined, along with the workload processing resources 124 within those nodes that will be allocated to the tasks. The sharing of such workload processing resources 124 can be considered in a control approach and upstream feedback may be provided for the node-assignment heuristic.

One aspect to consider in the choice of a processing node 101 for a workload assignment is the availability of information regarding the current state of the resources and the allocated workloads. Some aspects and characteristics of the processing nodes 101 are known only to the lower-level management and orchestration policies (such as those running within the processing nodes 101). In the upper-level, global mechanisms are assumed to know the composition of the nodes (that is, the workload processing resources 124 and static configurations), but may not have access to more dynamic information such as current occupancy, energy consumption and internal scheduling of devices.

Since a data center is typically a dynamic environment (with processing nodes 101 coming online or becoming inaccessible, for example) any efficient workload assignment heuristics should be as device-agnostic as possible, in one or more embodiments. A heuristic is employed in some embodiments for workload assignment that abstracts the current occupation of devices and instead relies on feedback information from the controllers 122. The intuition is that well-functioning controllers 122 will ease the requirements for the node-choice selection.

FIG. 6 illustrates an implementation 600 of the information processing system of FIG. 1 configured to assign a new workload 610 to one or more processing nodes 101 in the multi-node processing environment, according to one or more illustrative embodiments. In the example of FIG. 6, the representative processing nodes 101 and workload assignment node 105 is implemented in a similar manner as the workload assignment node 105 of FIG. 1.

As noted above, the candidate node evaluator 114 collects an available set of appropriate candidate processing nodes 101 for the new workload 610. The candidate node evaluator 114 may evaluate for each processing node 101, for example, (i) a response time, (ii) a throughput of computation (e.g., an estimation of how many workloads a respective node is able to deliver based on the information of execution time at a setup s, obtained from a workload analysis, such as an execution time of a workload given the number of cores, even with multiple workloads running simultaneously, to estimate when each workload will be delivered and estimate how many workloads a given node is able to deliver in a predefined timeframe), (iii) a total available memory, and/or (iv) whether a sufficient amount of one or more resources required by the given workload is available.

The candidate node evaluator 114 thus generates a set of candidate processing nodes 101 using known device requirements and SLAs. This decision may consider metrics such as node distance (measured in response time), throughput of computation, and total available memory of the node, as performed in J.E.R. Xiu, referenced above. Typically, workloads that require a specific resource will be identified at this step and only the nodes with adequate amounts of those resources are considered.

In addition, the controller feedback memory 112 records the resource allocation feedback from the controllers 122 of the respective processing nodes 101, using one or more controller feedback signals 620. The controller feedback signal 620 from each controller 122 may comprise, for example, an allocation of resources associated by the respective node (and/or an adjustment to a prior resource allocation), and a number of workloads executing on the respective node (e.g., the node load). The controller feedback signal 620 from each controller 122 may further comprise an execution time and/or a response time for each of the plurality of workloads executing on the respective node, reflecting a deployment cost.

When a new workload 610 is deployed, the exemplary workload assignment node 105 extracts known characteristics form the new workload 610. Typically, this information may be the result of preprocessing. Known characteristics of the workloads are used to relate the workloads to adequate device requirements. Notice that in at least some embodiments, only the workloads (and not the data) must be analyzed in order to perform this task.

The workload assignment module 116 evaluates the feedback information in the controller feedback memory 112 for the candidate processing nodes 101 identified by the candidate node evaluator 114 to assign the new workload 610 to one or more processing nodes 101. Once a given processing node 101 is selected by the workload assignment module 116, as described hereinafter, the workload assignment node 105 provides the new workload 610' to the selected given processing node 101, as shown in FIG. 6.

In one or more embodiments, the feedback information received from the processing nodes 101 is timestamped, so that only the feedback data in the controller feedback memory 112 with a timestamp more recent than k is considered, where k is the current timestamp minus the node-specific average workload lifetime for the nodes in question. In this manner, changes are not required to the controllers 122 at the device-level with respect to temporal information. The feedback information is stored in the controller feedback memory 112. In practice, the controller feedback memory 112 will sit at the central workload assignment node 105, but can optionally be replicated into one or more worker processing nodes 101 for resiliency.

As discussed above in conjunction with FIGS. 3 through 5, each worker processing node 101 has a way to automatically control resources given to a workload in order to cope with the respective SLAs. The resource adaptations performed by the controllers 122 are recorded in the controller feedback memory 112, and this feedback information is used to decide on higher level actions, as detailed below.

In some embodiments, an assignment of a new workload 610 to a given candidate processing node 101 by the workload assignment module 116 is based on one or more of: (i) a level of liberation of a given node, as represented by an amount of available resources on each candidate processing node 101, and (ii) a level of stability, as represented by a size of the resource allocation adaptations currently being made normalized by the biggest resource allocation adaptations happening in the nodes. The new workload 610 is assigned in some embodiments to the given candidate processing node 101 that having a minimal score.

Thus, in one or more embodiments, the workload assignment module 116 evaluates the following expression to assess each candidate processing node 101 as part of a workload assignment:

$$s_i = \theta_1 \cdot LL_i + \theta_2 \cdot SL_i,$$

$$LL_i = \frac{\#w_i}{\#w},$$

$$SL_i = \frac{\max(adap_i)}{\max(adap)},$$

where $LL_i$ is the level of liberation of candidate node i, $SL_i$ is the level of stability of candidate node i, $\#w_i$ is the number of currently running workloads in candidate node i, and $adap_i$ is the short memory matrix of adaptations in candidate node i. The same variables, without the indexes, have the meaning of searching globally across all of the candidate processing nodes 101.

In the current embodiment, the equation for evaluating the level of liberation of a given candidate processing node 101 estimates the amount of available resources for the given candidate processing node 101 by assuming that all workload have similar resource needs (although a single workload require all of the workload processing resources 124 of each given candidate processing node 101).

In some embodiments, $\theta_1$ and $\theta_2$ are positive hyperparameters that weight how much a workload assignment is performed based on how much each candidate is free (e.g., having more available resources) as opposed to choosing nodes that are currently more stable. Using $\theta_1 > 0$ and $\theta_2 = 0$ leads to a round robin choice, whereas using $\theta_1 = 0$ and $\theta_2 > 0$ leads to choosing a more stable candidate node first. A composition of both values leads to hybrid policies, and in at least one embodiment of the present disclosure, such parameters can be dynamically modified by an operator or automatically, in a per workload granularity.

During the execution of the workload in a selected candidate processing node 101, the controller 122 at the selected candidate processing node 101 sends information about stability of the selected candidate processing node 101 back to the workload assignment node 105 in order to provide feedback for subsequent executions, in the manner described above.

Figure 7:
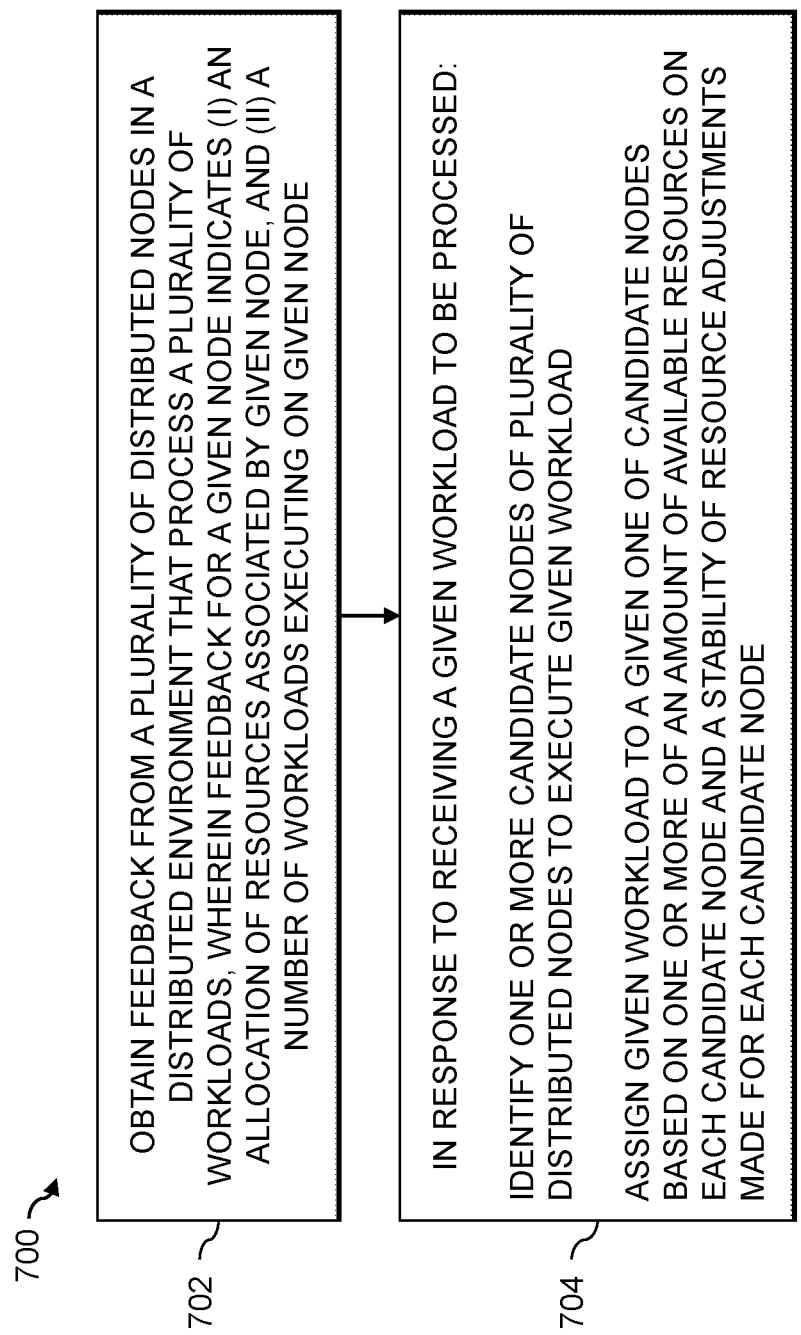
FIG. 7 is a flow chart illustrating a workload assignment process performed by the exemplary workload assignment module of FIG. 1, according to some embodiments.

FIG. 7 is a flow chart illustrating a workload assignment process 700 performed by the exemplary workload assignment module 116 of FIGS. 1 and 6, according to some embodiments. As shown in FIG. 7, the exemplary workload assignment process 700 initially obtains feedback from a plurality of distributed processing nodes 101 in the distributed environment of FIG. 1. As indicated above, in at least some embodiments, each processing node 101 comprises a controller 122 and a plurality of workload processing resources 124. During step 702, the feedback received for a given processing node 101 indicates (i) an allocation of resources associated by the given processing node 101, and (ii) a number of workloads executing on the given processing node 101. The feedback may also comprise an execution time for each of the plurality of workloads executing on the given processing node 101.

During step 704, in response to receiving a given workload to be processed, the exemplary workload assignment process 700: (i) identifies one or more candidate nodes of the plurality of distributed nodes to execute the given workload; and (ii) assigns the given workload to a given one of the candidate nodes based at least in part on one or more of an amount of available resources on each candidate node and a stability of resource adjustments made for each candidate node.

In some embodiments of the workload assignment process 700, the feedback for the given node is stored in a short-term memory, such as an implementation of the controller feedback memory 112, that retains the feedback based on an average workload lifetime for the given node.

The identifying the one or more candidate nodes to execute the given workload during some embodiments of step 704 evaluates, for each of the plurality of distributed nodes, one or more of (i) a response time, (ii) a throughput of computation, (iii) a total available memory, and (iv) whether a sufficient amount of one or more resources required by the given workload is available.

The assigning the given workload to the given candidate node during some embodiments of step 704 employs a respective weight for each of the amount of available resources on each candidate node and the stability of the resource adjustments made for each candidate node. For example, the assigning the given workload to the given candidate node may select the candidate node having a lowest value for a sum of the weighted amount of available resources and the weighted stability of the resource adjustments.

The controller 122 for each processing node 101 controls an assignment of resources to each workload executing on the respective node to satisfy one or more service level requirements.

In one or more embodiments, the amount of available resources on each candidate processing node 101 is evaluated based on the number of workloads executing on each of the candidate nodes relative to the total number of workloads executing in the distributed environment. Likewise, the stability of the resource adjustments made for each candidate node is evaluated in some embodiments based on a maximum resource adjustment made for a given candidate node relative to a maximum resource adjustment made for each of the candidate nodes.

The particular processing operations and other network functionality described in conjunction with the flow diagram of FIG. 7 are presented by way of illustrative example only, and should not be construed as limiting the scope of the disclosure in any way. Alternative embodiments can use other types of processing operations to assign workloads to processing nodes 101 in the multi-node processing environment of FIG. 1 using resource allocation feedback from each processing node 101. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

One or more embodiments of the disclosure provide techniques for assigning workloads to processing nodes 101 in the multi-node processing environment of FIG. 1 using resource allocation feedback from each processing node 101. In some embodiments, the exemplary workload assignment module 116 has access to the entire data center of the FIG. 1 embodiment, for example, in terms of which processing nodes 101 are available and the particular workload processing resources 124 that are present on each processing node 101.

Among other benefits, the disclosed workload assignment techniques consider a combination of feedback parameters from each processing node 101 in order to assign a new workload to a given node processing node 101 in the multi-node processing environment of FIG. 1, using the resource allocation feedback from each processing node 101.

One or more embodiments of the disclosure provide improved methods, apparatus and computer program products for assigning workloads to nodes in a multi-node processing environment using resource allocation feedback from each node. The foregoing applications and associated embodiments should be considered as illustrative only, and numerous other embodiments can be configured using the techniques disclosed herein, in a wide variety of different applications.

It should also be understood that the disclosed workload assignment techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for assigning workloads to nodes in a multi-node processing environment using resource allocation feedback from each node may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based workload assignment engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based workload assignment platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
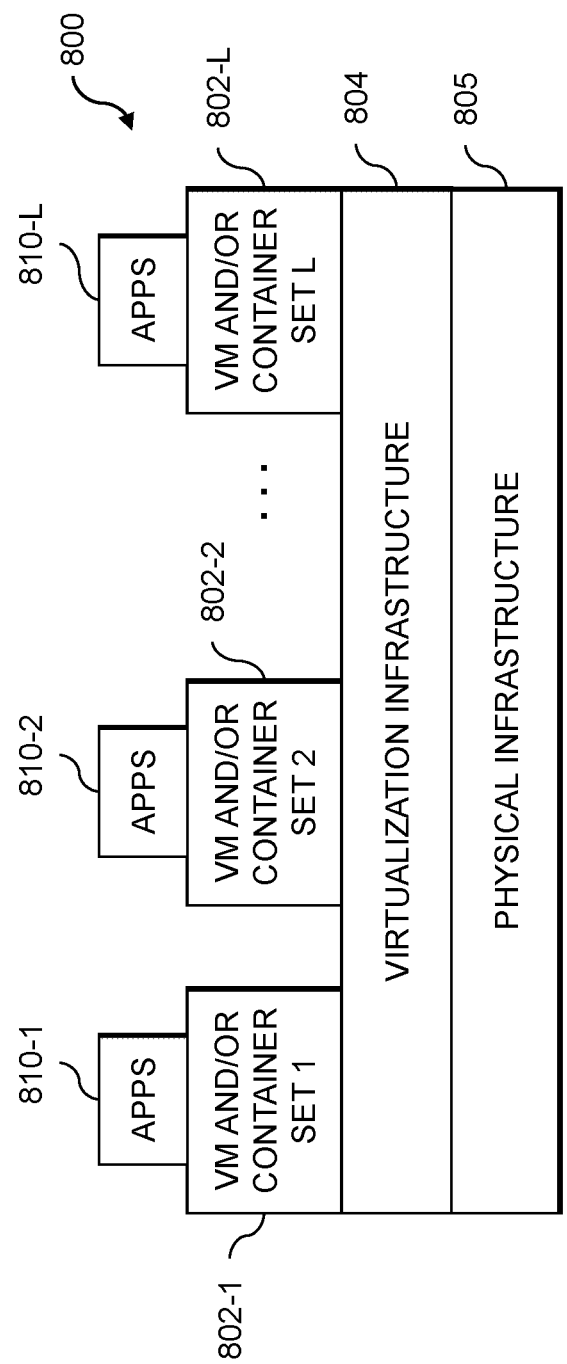
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide workload assignment functionality of the type described above for one or more processes running on a given one of the VMs. For example, each of the VMs can implement workload assignment control logic and associated controller feedback collection techniques for providing such workload assignment functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide workload assignment functionality of the type described above for one or more processes running on different ones of the containers. For example, a container host device supporting multiple containers of one or more container sets can implement one or more instances of workload assignment control logic and associated d controller feedback collection techniques for use in generating workload assignments.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an application specific integrated circuit (ASIC), a field programmable gate array (FPGA) or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
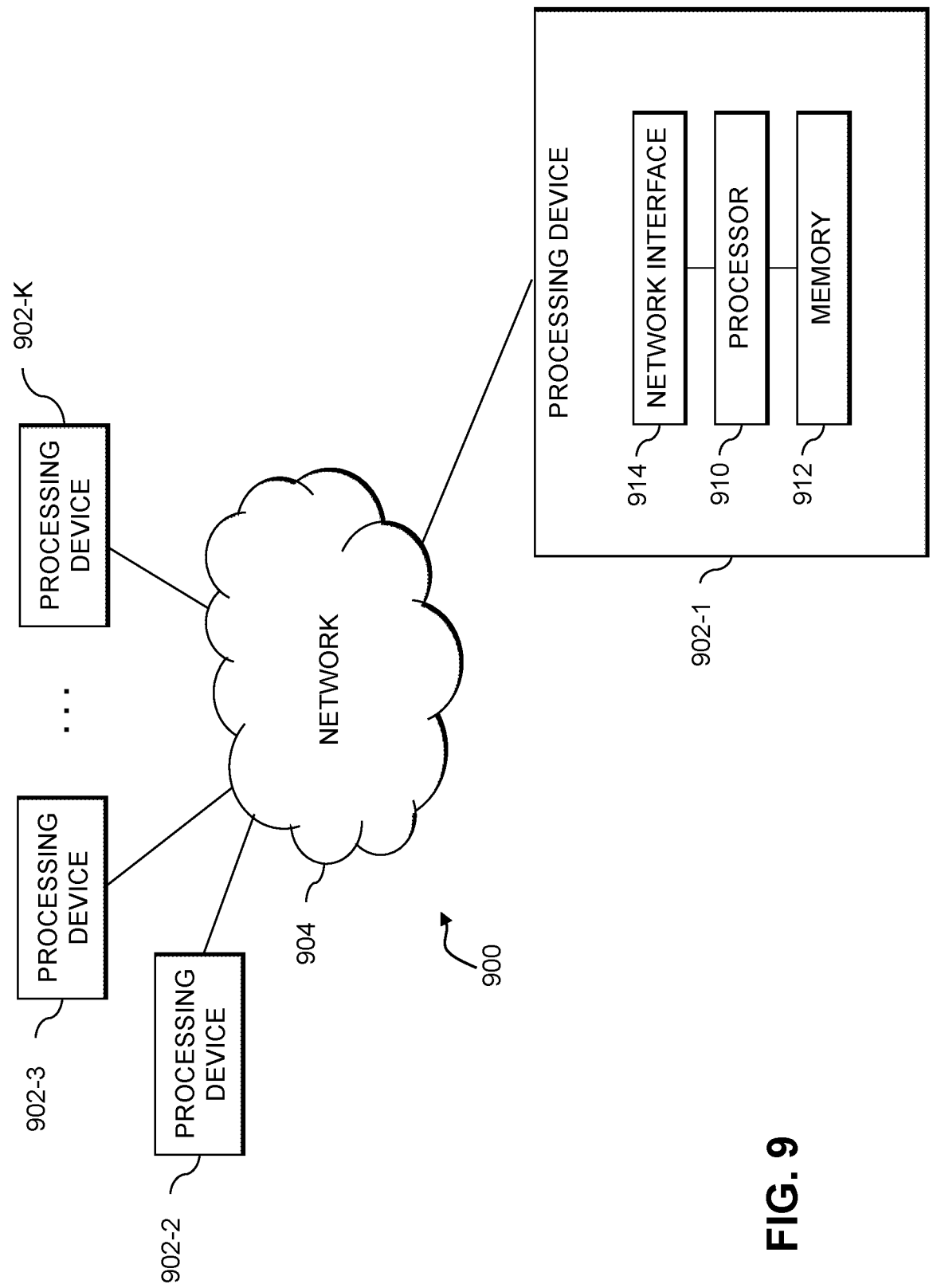
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
   obtaining feedback from a plurality of distributed nodes in a distributed environment that processes a plurality of workloads, wherein each node comprises a controller and one or more processing devices and wherein the feedback for a given node indicates (i) an allocation of resources associated with the given node, and (ii) a number of workloads executing on the given node; and
   performing the following steps, in response to receiving a given workload to be processed:
   identifying one or more candidate nodes of the plurality of distributed nodes to execute the given workload;
   determining a total amount of available resources on each candidate node;
   assigning the given workload to a given one of the candidate nodes based at least in part on the determined total amount of available resources on each candidate node and a stability of resource adjustments made for each candidate node, wherein the stability of resource adjustments made for each candidate node comprises an indication of a size of one or more adjustments to the allocation of resources associated with the given node; and
   initiating an execution of the given workload on the given one of the candidate nodes.

2. The method of claim 1, wherein the feedback for the given node is stored in a short-term memory that retains the feedback based at least in part on an average workload lifetime for the given node.

3. The method of claim 1, wherein the identifying the one or more candidate nodes to execute the given workload evaluates, for each of the plurality of distributed nodes, one or more of (i) a response time, (ii) a throughput of computation, (iii) a total available memory, and (iv) whether a sufficient amount of one or more resources required by the given workload is available.

4. The method of claim 1, wherein the controller for each node controls an assignment of resources to each workload executing on the respective node to satisfy one or more service level requirements.

5. The method of claim 1, wherein the assigning the given workload to the given candidate node employs a respective weight for each of the amount of available resources on each candidate node and the stability of the resource adjustments made for each candidate node.

6. The method of claim 5, wherein the assigning the given workload to the given candidate node selects the candidate node based at least in part on a sum of the weighted amount of available resources and the weighted stability of the resource adjustments.

7. The method of claim 1, wherein the amount of available resources on each candidate node is evaluated based at least in part on the number of workloads executing on each of the candidate nodes relative to the total number of workloads executing in the distributed environment.

8. The method of claim 1, wherein the stability of the resource adjustments made for each candidate node is evaluated based at least in part on a maximum resource adjustment made for a given candidate node relative to a maximum resource adjustment made for each of the candidate nodes.

9. The method of claim 1, wherein the feedback further comprises an execution time for each of the plurality of workloads executing on the given node.

10. An apparatus comprising:
    at least one processing device comprising a processor coupled to a memory;
    the at least one processing device being configured to implement the following steps:
    obtaining feedback from a plurality of distributed nodes in a distributed environment that processes a plurality of workloads, wherein each node comprises a controller and one or more processing devices and wherein the feedback for a given node indicates (i) an allocation of resources associated with the given node, and (ii) a number of workloads executing on the given node; and
    performing the following steps, in response to receiving a given workload to be processed:
    identifying one or more candidate nodes of the plurality of distributed nodes to execute the given workload;
    determining a total amount of available resources on each candidate node;
    assigning the given workload to a given one of the candidate nodes based at least in part on the determined total amount of available resources on each candidate node and a stability of resource adjustments made for each candidate node, wherein the stability of resource adjustments made for each candidate node comprises an indication of a size of one or more adjustments to the allocation of resources associated with the given node; and
    initiating an execution of the given workload on the given one of the candidate nodes.

11. The apparatus of claim 10, wherein the feedback for the given node is stored in a short-term memory that retains the feedback based at least in part on an average workload lifetime for the given node.

12. The apparatus of claim 10, wherein the identifying the one or more candidate nodes to execute the given workload evaluates, for each of the plurality of distributed nodes, one or more of (i) a response time, (ii) a throughput of computation, (iii) a total available memory, and (iv) whether a sufficient amount of one or more resources required by the given workload is available.

13. The apparatus of claim 10, wherein the assigning the given workload to the given candidate node employs a respective weight for each of the amount of available resources on each candidate node and the stability of the resource adjustments made for each candidate node, and wherein the assigning the given workload to the given candidate node selects the candidate node based at least in part on a sum of the weighted amount of available resources and the weighted stability of the resource adjustments.

14. The apparatus of claim 10, wherein the stability of the resource adjustments made for each candidate node is evaluated based at least in part on a maximum resource adjustment made for a given candidate node relative to a maximum resource adjustment made for each of the candidate nodes.

15. The apparatus of claim 10, wherein the feedback further comprises an execution time for each of the plurality of workloads executing on the given node.

16. A non-transitory processor-readable storage medium having stored therein program code of one or more software programs, wherein the program code when executed by at least one processing device causes the at least one processing device to perform the following steps:

obtaining feedback from a plurality of distributed nodes in a distributed environment that processes a plurality of workloads, wherein each node comprises a controller and one or more processing devices and wherein the feedback for a given node indicates (i) an allocation of resources associated with the given node, and (ii) a number of workloads executing on the given node; and performing the following steps, in response to receiving a given workload to be processed:

identifying one or more candidate nodes of the plurality of distributed nodes to execute the given workload;

determining a total amount of available resources on each candidate node;

assigning the given workload to a given one of the candidate nodes based at least in part on the determined total amount of available resources on each candidate node and a stability of resource adjustments made for each candidate node, wherein the stability of resource adjustments made for each candidate node comprises an indication of a size of one or more adjustments to the allocation of resources associated with the given node; and initiating an execution of the given workload on the given one of the candidate nodes.

17. The non-transitory processor-readable storage medium of claim 16, wherein the feedback for the given node is stored in a short-term memory that retains the feedback based at least in part on an average workload lifetime for the given node.

18. The non-transitory processor-readable storage medium of claim 16, wherein the identifying the one or more candidate nodes to execute the given workload evaluates, for each of the plurality of distributed nodes, one or more of (i) a response time, (ii) a throughput of computation, (iii) a total available memory, and (iv) whether a sufficient amount of one or more resources required by the given workload is available.

19. The non-transitory processor-readable storage medium of claim 16, wherein the assigning the given workload to the given candidate node employs a respective weight for each of the amount of available resources on each candidate node and the stability of the resource adjustments made for each candidate node, and wherein the assigning the given workload to the given candidate node selects the candidate node based at least in part on a sum of the weighted amount of available resources and the weighted stability of the resource adjustments.

20. The non-transitory processor-readable storage medium of claim 16, wherein the stability of the resource adjustments made for each candidate node is evaluated based at least in part on a maximum resource adjustment made for a given candidate node relative to a maximum resource adjustment made for each of the candidate nodes.

* * * * *